H. ZIEMSS, Jr.
BRAKE BEAM.
APPLICATION FILED SEPT. 2, 1908.

923,475.

Patented June 1, 1909.

Witnesses:

Inventor:
Henry Ziemss Jr.
By Luther L. Miller
Atty.

UNITED STATES PATENT OFFICE.

HENRY ZIEMSS, JR., OF CHICAGO, ILLINOIS.

BRAKE-BEAM.

No. 923,475.   Specification of Letters Patent.   Patented June 1, 1909.

Application filed September 2, 1908. Serial No. 451,359.

*To all whom it may concern:*

Be it known that I, HENRY ZIEMSS, Jr., a citizen of the United States, residing at Chicago, in the county of Cook and State of Illinois, have invented certain new and useful Improvements in Brake-Beams, of which the following is a specification.

The object of this invention is to provide improved means for adjustably securing the brake head to the brake beam.

Figure 1:
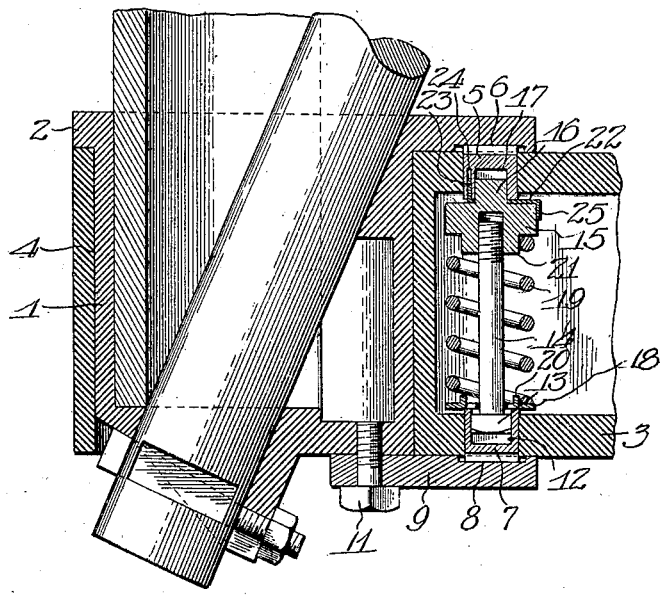
Figure 2:
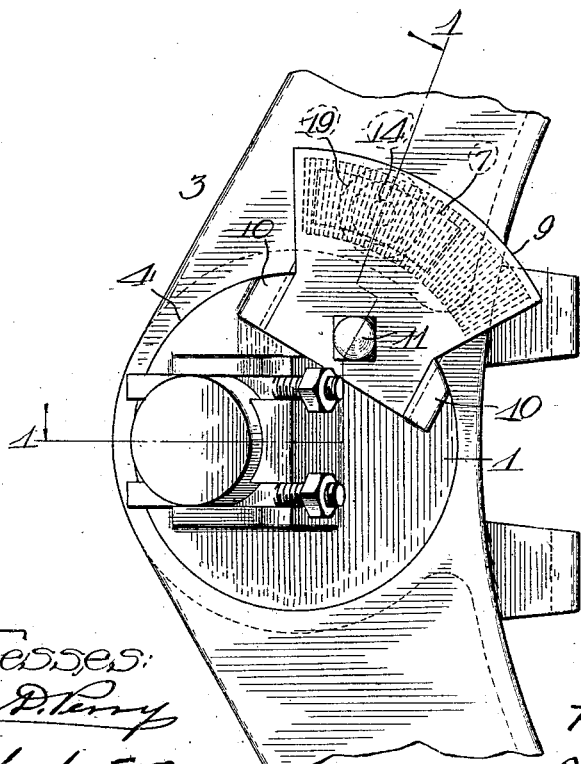

In the accompanying drawings, Figure 1 is a fragmental sectional view of a brake beam and a brake head embodying the features of my invention. This view is taken substantially upon the plane of dotted line 1 1 of Fig. 2, the latter view being a fragmental end elevation.

The embodiment which I have chosen for illustration comprises a sleeve 1 having an end flange 2. The brake head 3 has a circular opening 4 to receive the sleeve 1, said brake head being arranged to lie against the flange 2 and thereby be held against movement longitudinally of the brake beam in one direction.

The means for locking the brake head in desired angular adjustment upon the beam comprises, in this instance, a toothed block 5 slidably mounted in one side of the brake head and adapted to engage a toothed surface 6 upon the flange 2, and a similar block 7 adapted to engage a toothed surface 8 upon the inner side of a flange 9. The last mentioned flange is removably secured to the outer end of the sleeve 1 in order that the brake head 3 may be placed upon the beam and removed when desired. As herein shown, a portion of the flange 9 lies between undercut lugs 10 on the sleeve 1, a bolt 11 securing the flange to said sleeve. The toothed block 7 has an opening 12 therein within which lies the head 13 of a bolt 14. Any suitable means may be used to make the head 13 non-rotatable in the opening 12; said head may be square and the opening 12 of corresponding form. The other end of said bolt has a screw-thread engagement with a nut 15, which may be hexagonal or of any other form adapted for engagement by a wrench or similar tool. Said nut 15 has a cylindrical stud or pivot 16 thereon, which is rotatably mounted in an opening 17 in the locking block 5. 18 is a washer lying against the locking block 7 and having an opening therein, through which the bolt 14 passes. A coiled spring 19 lies between the washer 18 and the nut 15, being held in place by lugs 20 on the washer 18 and a portion 21 of reduced diameter on the nut 15.

When the parts are arranged as illustrated and as just described, the spring 19, bearing against the nut 15 and the washer 18, holds the locking blocks 5 and 7 yieldingly in engagement with the flanges 2 and 9. The nut 15 may be locked against accidental rotation by any well known or preferred means, such as a washer 22 having a lug 23 adapted to lie in an opening 24 in the locking block 5, and a lug 25 adapted to be turned up into contact with one of the angular faces of the nut 15.

When it is desired to lock the brake head 3 positively against movement with relation to the brake beam, the nut 15 may be rotated to force the head of the bolt 13 against the bottom of the opening 12 and thereby hold both of the locking blocks 5 and 7 unyieldingly against the flanges 2 and 9.

I wish it to be understood that I do not desire to be limited to the exact details of construction shown and described for obvious modifications will occur to a person skilled in the art.

I claim as my invention:

1. A brake beam having two projecting portions thereon; a brake head held from longitudinal movement by said portions; and locking means carried by said head and adapted to engage said portions yieldingly, said locking means also being adapted to engage said portions rigidly.

2. A brake beam having two projecting portions thereon; a brake head adapted to lie between said portions; two members movably mounted in opposite sides of said brake head; and means for holding said members against said portions.

3. A brake beam having two toothed portions thereon; a brake head adapted to lie between said portions; two toothed members movably mounted in opposite sides of said head; and means for holding said members in engagement with said portions.

4. A brake beam having two projecting portions thereon; a brake head adapted to lie between said portions; two blocks slidably mounted in opposite sides of said brake head; and a coiled spring lying between said blocks and holding said blocks in engagement with said portions.

5. A brake beam having two projecting portions thereon; a brake head adapted to lie between said portions; two locking members movably mounted in opposite sides of said brake head and arranged to engage said projecting portions; a bolt having a head non-rotatably engaging one of said locking members; and a nut rotatably engaging the other locking member and threaded upon said bolt.

6. The combination of a brake beam; a brake head mounted on said brake beam; means on said beam to limit inward movement of said brake head; a flange on said brake beam overlying said brake head; a lug against which said flange lies; and a bolt extending through said flange into said beam.

HENRY ZIEMSS, JR.

Witnesses:
CHAS. ZIEMSS,
ANDREW HAERB.